United States Patent
Egnell et al.

(10) Patent No.: US 8,971,386 B2
(45) Date of Patent: Mar. 3, 2015

(54) RECEIVER UNIT AND METHOD FOR SUPPRESSING INTERFERENCE IN A MULTIPATH RADIO SIGNAL

(75) Inventors: Henrik Egnell, Uppsala (SE); Nina Blom, Göteborg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/238,896

(22) PCT Filed: Aug. 17, 2011

(86) PCT No.: PCT/SE2011/050995
§ 371 (c)(1),
(2), (4) Date: Feb. 14, 2014

(87) PCT Pub. No.: WO2013/025134
PCT Pub. Date: Feb. 21, 2013

(65) Prior Publication Data
US 2014/0198829 A1 Jul. 17, 2014

(51) Int. Cl.
*H04B 1/00* (2006.01)
*H04B 1/7117* (2011.01)
(Continued)

(52) U.S. Cl.
CPC .......... *H04B 1/7117* (2013.01); *H04B 1/7115* (2013.01); *H04B 1/712* (2013.01); *H04B 1/709* (2013.01)
USPC ........... 375/148; 375/260; 375/272; 375/285; 375/343; 375/367

(58) Field of Classification Search
CPC ............... H04B 1/7117; H04B 1/7115; H04B 2201/709727; H04B 1/7113; H04B 2001/70935; H04B 1/712; H04B 1/709; H04J 11/0063
USPC ................. 375/148, 260, 272, 285, 343, 367; 370/203, 204, 208, 209
See application file for complete search history.

(56) References Cited

U.S. PATENT DOCUMENTS

2004/0253934 A1 12/2004 Ryu et al.

FOREIGN PATENT DOCUMENTS

EP 1499032 A1 1/2005
EP 1990927 A1 11/2008
(Continued)

OTHER PUBLICATIONS

Tracy Fulghum, "Adaptive Generalized Rake Reception in DS-CDMA Systems" IEEE transactions on wireless communications, Month 2009.*

(Continued)

*Primary Examiner* — Dhaval Patel
(74) *Attorney, Agent, or Firm* — Coats & Bennett, PLLC

(57) ABSTRACT

The invention relates to the field of radio signal receivers for use in wireless communication networks. In particular to a receiver unit having at least one antenna input for receiving multipath radio signals via a radio unit and at least one antenna from one or more user equipments is provided. The receiver unit comprises: a despreading unit configured to despread a multipath radio signal in the received multipath radio signals using a number of despreading fingers corresponding to a number of delay positions in the multipath radio signal which corresponds to a number of paths in the multipath radio signal, and a combining unit configured to apply at least one weight to the output of each of the number of allocated despreading fingers and combine the weighted outputs into a resulting equalized radio signal. The receiver unit is characterized in that it is configured to calculate auto-correlation values based on all multipath radio signals received at the at least one antenna input, determine at least one auto-correlation value based on the calculated auto-correlation values, determine at least one time value based on the at least one determined auto-correlation value, and allocate at least one interference suppression finger to a delay position in the multipath radio signal based on the at least one determined time value. The invention further relates to a receiver, a network node and a method for suppressing interference in a received multipath radio signal in a receiver unit.

27 Claims, 5 Drawing Sheets

(51) Int. Cl.
*H04B 1/7115* (2011.01)
*H04B 1/712* (2011.01)
*H04B 1/709* (2011.01)

(56) References Cited

FOREIGN PATENT DOCUMENTS

| | | |
|---|---|---|
| GB | 2456910 A | 8/2009 |
| WO | 0049724 A1 | 8/2000 |
| WO | 2010111405 A2 | 9/2010 |

OTHER PUBLICATIONS

Kim, Su Il, et al., "Performance improvement of RAKE receiver for a Multicode DS-CDMA System with Multistage Interference Cancellation Detectors", Proceedings of the IEEE Region 10 Conference, 199-09-15, pp. 573-576, vol. 1, IEEE.

Baltersee, J., et al., "A Novel Multipath Interference Cancellation Scheme for RAKE Channel Estimation", IEEE VTS 53rd Vehicular Technology Conference, May 6, 2001, pp. 1493-1497, vol. 2, IEEE.

* cited by examiner

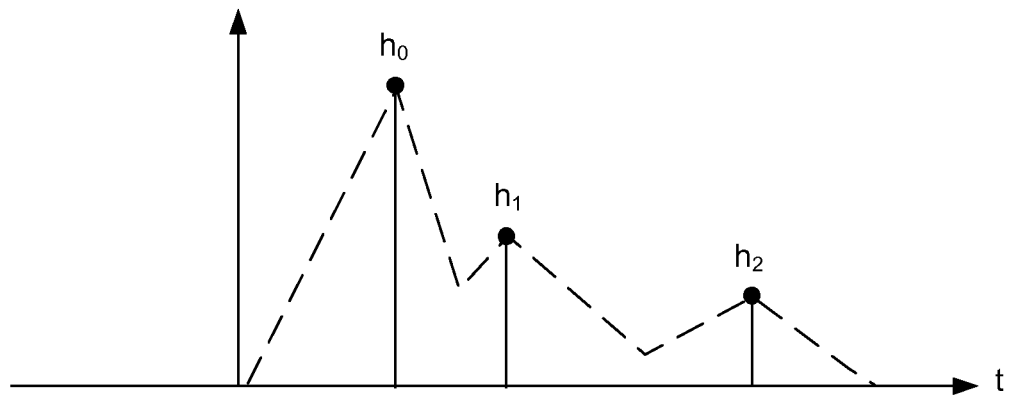
Fig. 1A - PRIOR ART
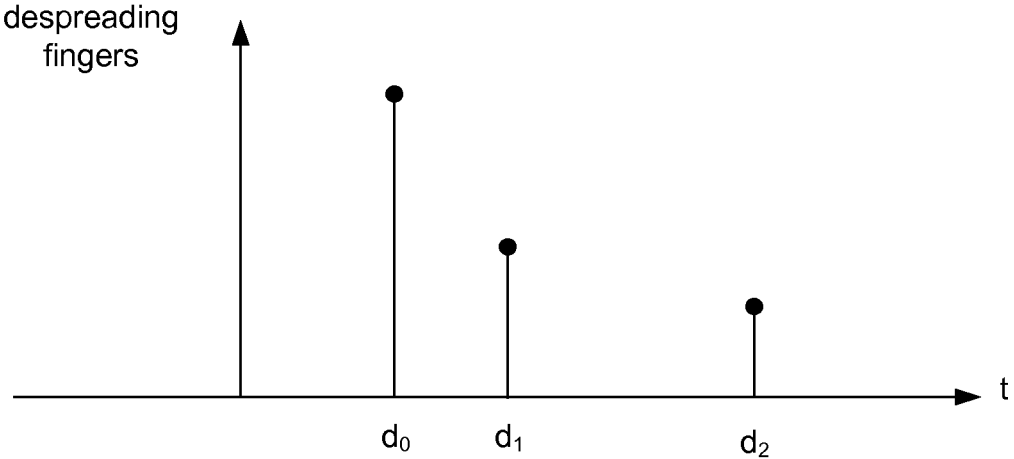
Fig. 1B - PRIOR ART

RECEIVER UNIT AND METHOD FOR SUPPRESSING INTERFERENCE IN A MULTIPATH RADIO SIGNAL

TECHNICAL FIELD

The invention relates to the field of radio signal receivers for use in wireless communication networks, in particular to a receiver unit. The invention also relates to a receiver comprising such a receiving unit, a network node comprising such a receiver, and a method for suppressing interference in a multipath radio signal.

BACKGROUND

In wireless communications, the physical channel between the transmitter and the receiver is formed by a radio link. In most cases, many different propagation paths exist between the transmitter and the receiver. This is due to reflections in the environment, for example, against buildings, and gives rise to a multipath channel with several resolvable components for each transmitter.

The performance of a Code Division Multiple Access (CDMA) receiver is improved if the signal energy carried by many multipath components is utilized. This is traditionally achieved by using a RAKE receiver. A detailed description of RAKE receivers may be found, for example, in the book "WCDMA for UMTS" by Holma, & Toskala, A. (Wiley 2000).

A RAKE receiver includes usage of various 'fingers', or despreaders, each finger having an assigned path delay for receiving a particular image of a multipath radio signal and a correlator for despreading the received image. In combination, the fingers despread multiple signal images of a received multipath radio signal, thus mitigating the effect of the multipath channel fading phenomenon. In other words, in a RAKE receiver, each multipath component is assigned a RAKE finger, or despreader, whose reference copy of the spreading code is delayed equally to the path delay of the corresponding multipath component. The outputs of the RAKE fingers are then coherently combined in order to produce a symbol estimate. As shown in FIGS. 1A-B, this is performed by the RAKE receiver by utilizing its knowledge of the channel response (dashed line) for all paths $h_0$, $h_1$, $h_2$ and corresponding multipath delays $d_0$, $d_1$, $d_2$. The channel estimation of each path in the multipath radio signal being directly determined based on channel response.

The combining of the outputs in the RAKE receiver improves the signal-to-noise ratio (SNR) since it allows the desired signal components to be summed coherently, while the interference and noise components are summed non-coherently. When the noise components are uncorrelated at each RAKE finger, they partially cancel each other out, while the signal components are rotated so as to sum constructively. The combining in the RAKE receiver is normally performed by weighting the different signal components according to their conjugated channel response at their respective delay. RAKE receivers normally work well when the spreading factors (SF) are large, for example, a ratio of 256, which means that there is only a small amount of correlation between the different RAKE fingers.

In WCDMA, a requirement added in the 3GPP standard (in Release 6) was the Enhanced Uplink (EUL). With the introduction of EUL, the spreading factors may be as low as a ratio of 2, which means that there may be a significant amount of correlation between the different RAKE fingers. In these cases, the achievable SNR by the RAKE receiver is limited mainly by the interference from other users, such as, Multi User Interference (MUI), and the self-interference of the user, such as, Inter Symbol Interference (ISI) and Inter Channel Interference (ICI).

For dealing with this situation, Generalised RAKE (GRAKE) was designed. GRAKE receivers estimate the correlations between the RAKE fingers and use these correlations to modify the weights of the different signal components. Besides using the RAKE fingers that collect signal energy of the multipath radio signal received at the antenna, a number of "interference suppression" fingers are added to collect information about the interference on the RAKE fingers and used to cancel this interference. The locations of the "interference suppression" fingers may, for example, be based on the self-interference of the specific user. Furthermore, in addition to weights based on the estimated channel response as in a RAKE receiver, GRAKE receivers also uses the correlation between the impairment (interference plus noise) on different fingers in order to suppress interference.

It should also be noted that while WCDMA was originally designed for many low data rate (LDR) users, that is, users using voice and data services having low data transmission rates, such as, for example, voice calls and text messaging, the number of high data rate (HDR) users, that is, users using data services having high data transmission rates, such as, for example, video calls and video streaming, is constantly increasing. This new usage has also added new requirements on the uplink.

SUMMARY

An object of the invention is to improve interference suppression in a receiver.

Accordingly, a receiver unit having at least one antenna input for receiving multipath radio signals via a radio unit and at least one antenna from one or more user equipments is provided. The receiver unit comprises: a despreading unit configured to despread a multipath radio signal in the received multipath radio signals using a number of despreading fingers corresponding to a number of delay positions in the multipath radio signal which corresponds to a number of paths in the multipath radio signal currently, and a combining unit configured to apply at least one weight to the output of each of the number of allocated despreading fingers and combine the weighted outputs into a resulting equalized radio signal. The receiver unit is characterised in that it is configured to calculate auto-correlation values based on all multipath radio signals received at the at least one antenna input, determine at least one auto-correlation value based on the calculated auto-correlation values, determine at least one time value based on the at least one determined auto-correlation value, and allocate at least one interference suppression finger to a delay position in the multipath radio signal based on the at least one determined time value.

Furthermore, a method for suppressing interference in a received multipath radio signal in a receiver unit is also provided. The receiver unit having at least one antenna input for receiving multipath radio signals via a radio unit and at least one antenna from one or more user equipments. The method comprises the steps of: allocating a number of despreading fingers to a number of delay positions in the multipath radio signal corresponding to at least one path in the multipath radio signal currently having the largest amount of signal energy, and apply at least one equalizing weight to the output of each of the number of allocated despreading fingers and combining the weighted outputs into a resulting equalized radio signal. The method is characterised in that it further comprises: calculating auto-correlation values based on the sum of all multipath radio signals received at the at least one antenna input, determining at least one auto-correlation value based on the calculated auto-correlation values, determining at least one time value based on the at least one determined auto-correlation value, and allocating at least one interference suppression finger to a delay position in the multipath radio signal based on the at least one determined time value.

One advantage of the receiver unit and method described above is that by using commonly calculated auto-correlation values in order to determine the delay positions of the interference suppression fingers for each received multipath radio signal received from each individual user equipment, the performance of the interference suppression from each individual user equipment may be significantly improved. Particularly, for example, for a user equipment transmitting at low power and experiencing large amounts of interference from one or more other user equipments which transmits at high power.

Also, the receiver unit and method described above reduces the computional complexity of and thus the amount of hardware resources needed for the receiver unit and for implementing the method.

Furthermore, the conventional GRAKE-computations require large amounts of hardware resources to be used due to the computational complexity of the potentially large equation systems that consequently needs to be solved for each user. This is because the size of the resulting equation system depends on the number of RAKE fingers of the antenna, as well as, the number of "interference suppression" fingers that are added. Therefore, due to the large equation system to be solved for each user, it may be difficult to provide all users in a wireless communication network with a full GRAKE reception on the uplink. This is also true for the non-parametric version of GRAKE, also referred to as GRAKE+. Furthermore, due to the small amount of self-interference normally experienced for the LDR users, the gains from GRAKE reception are not very significant for the LDR users. Taking this into account a straight-forward solution to this issue would be to use conventional RAKE receivers for the LDR users and use GRAKE receivers only for the HDR users. However, in the presence of a growing number of HDR users transmitting at high power in order to achieve the high data transmission rates, the conventional RAKE receivers for the LDR users will be sensitive to interference from the HDR users. This will result in poor performance by the conventional RAKE receivers.

Furthermore, since the conventional RAKE receivers do not suppress interference as in the GRAKE receivers, the conventional RAKE receivers will require the LDR users to transmit at higher power to penetrate the noise floor created by the HDR user interference. This may increase the risk of power rushes in the user equipment of the LDR users.

Thus, a further object of the invention is to obviate at least some of the above disadvantages and achieve a low complexity receiver for LDR users with improved interference suppression.

This object is addressed by the receiving unit described above by further being configured to: determine at least one interference suppression equalizing weight for the at least one interference suppression finger based on the at least one determined auto-correlation value, and enable the combining unit to apply the at least one determined interference suppression equalizing weight to the output of the at least one interference suppression finger and combine the weighted interference suppression output with the weighted outputs into the resulting equalized radio signal.

Furthermore, this object is also addressed by the method described above by further comprising: determining at least one interference suppression equalizing weight for the at least one interference suppression finger based on the at least one determined auto-correlation value, and enabling the application of the at least one determined interference suppression equalizing weight to the output of the at least one interference suppression finger and combination of the weighted interference suppression output with the weighted outputs into the resulting equalized radio signal.

One advantage of the receiver unit and method described above is that it only requires the auto-correlation values, commonly computed for all users, and the estimated channel at the energy RAKE fingers (that is, the delay positions in each received multipath radio signal corresponding to the paths in each multipath radio signal currently having the largest amount of signal energy) in order to calculate the interference suppression equalizing weights of the interference suppression fingers. This yields a low computational complexity, while still achieving a significantly improved performance of the interference suppression. This particularly advantageous for signals from LDR users transmitting at low power subjected to interference from signals from HDR users transmitting at high power. Furthermore, it also improves the conventional RAKE receiver for LDR users at a low cost.

In addition, a receiver comprising a receiver unit as described above and a network node for use in a wireless communication network comprising a receiver as described above is provided.

BRIEF DESCRIPTION OF THE DRAWINGS

The above and other features and advantages of the invention will become readily apparent to those skilled in the art by the following detailed description of exemplary embodiments thereof with reference to the accompanying drawings, wherein:

FIG. 1A illustrates a channel response of a received multipath radio signal for a user equipment, FIG. 1B schematically illustrates the RAKE despreading fingers corresponding to the received multipath radio signal in FIG. 1 of the conventional RAKE receiver, FIG. 2 schematically illustrates an example of wireless communication system comprising a number of users and a receiver according to an embodiment of the invention, FIG. 3 schematically illustrates a receiver unit according to an embodiment of the invention, FIG. 4A schematically illustrates an example of a channel response of a received multipath radio signal from a user equipment, FIG. 4B schematically illustrates an example of auto-correlation values calculated in a receiver unit according to an embodiment of the invention, FIG. 4C-E schematically illustrates exemplary RAKE despreading fingers and interference suppression fingers according to some embodiments of the invention.

DETAILED DESCRIPTION

Figure 2:
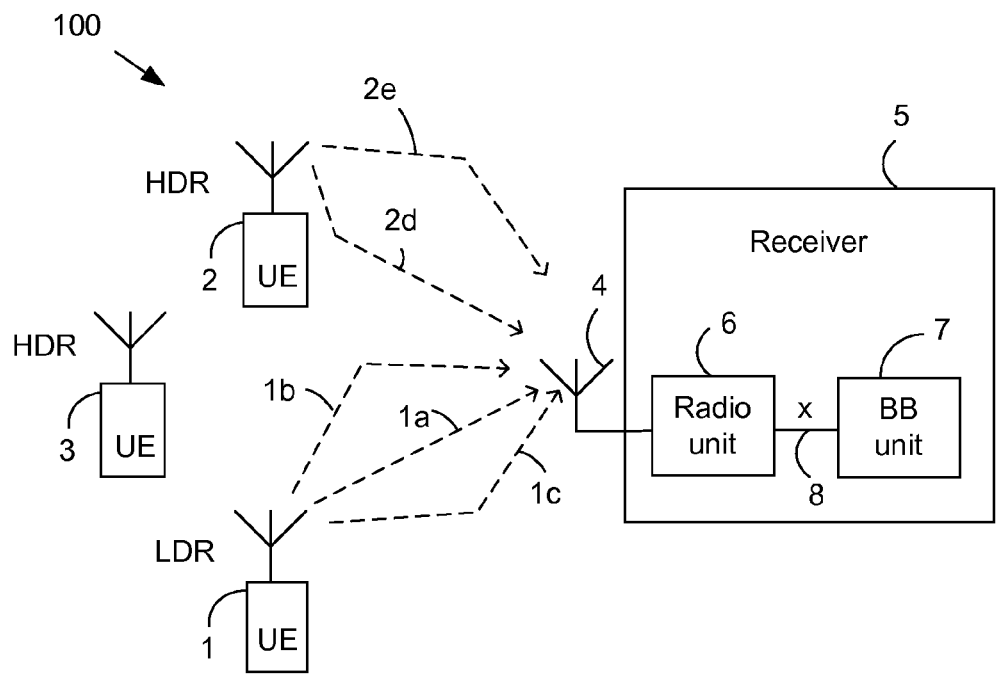

The figures are schematic and simplified for clarity, and they merely show details which are essential to the understanding of the invention, while other details have been left out. Throughout, the same reference numerals are used for identical or corresponding parts or steps. It may also be noted that the expression "user equipment" or "UE" includes, but is not limited to, a mobile terminal, a mobile phone, a personal digital assistant, a mobile station, a portable computer equipped with suitable transceivers, a stationary computer equipped with suitable transceivers and the like.

In FIG. 2, an example of a wireless communication system 100 comprising a plurality of users each having a UE 1, 2, 3 and a receiver 5 according to an embodiment of the invention is illustrated. The receiver 5 may comprise at least one antenna 4 for simultaneously receiving multipath radio signals from each of the plurality of UEs 1, 2, 3. As illustrated in FIG. 2, the receiver 5 may, for example, be configured to receive one multipath radio signal 1a-1c from the UE 1 over one channel, and to receive another multipath radio signal 2d-e from the UE 2 over another channel using the at least one antenna 4. In the receiver 5, the received multipath radio signals 1a-c, 2d-e may be initially processed in a radio unit 6 before being processed in a receiving unit 7. The receiving unit 7 may also be referred to a BB unit or baseband unit since it operates on the baseband level. The radio unit 6 may be arranged to output a signal x comprising all of the received multipath radio signals 1a-c, 2d-e from all UEs 1, 2, 3 on the different channels to an antenna input 8 of the receiving unit 7.

Figure 3:
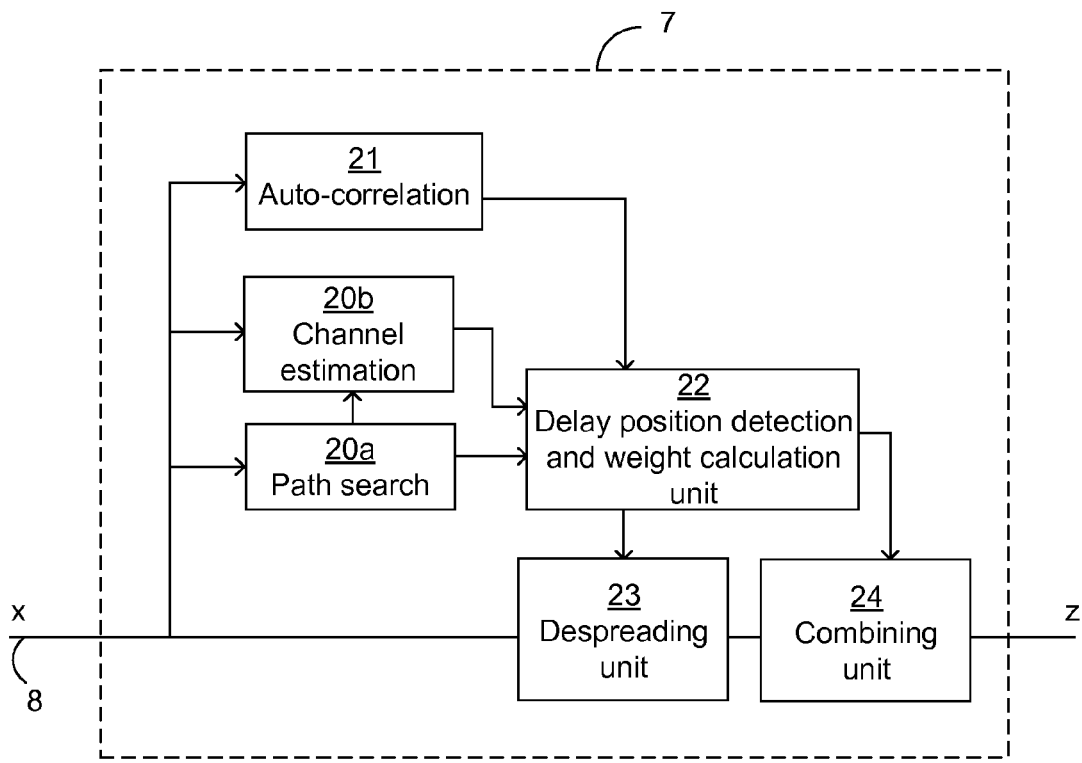

FIG. 3 schematically illustrates a receiver unit 7 according to an embodiment of the invention. As shown in FIG. 3, the receiver unit 7 may comprise a path searching unit 20a and a channel estimation unit 20b. The path searching unit 20a may process the received signal x outputted from the radio unit 6 in order to extract relevant paths for each of the received multipath radio signals 1a-c, 2d-e. The channel estimation unit 20b may be configured to produce channel estimations for each of the received multipath radio signals 1a-c, 2d-e. Data from the path searching unit 20a and the channel estimation unit 20b may then be outputted to and used by a delay position detection and weight calculation unit 22. It should be noted that the path searching unit 20a and the channel estimation unit 20b may be implemented in a manner that is known in the art.

The receiver unit 23 further comprises a despreading unit 23 and a combining unit 24. The despreading unit 23 is configured to despread the signal x from the radio unit 6 corresponding to the delay positions selected by the delay position detection and weight calculation unit 22. In other words, the despreading unit 23 is configured to despread each multipath radio signal 1a-c, 2d-e in the signal x using despreading fingers allocated by the delay position detection and weight calculation unit 22 to the delay positions unique for each multipath radio signal 1a-c, 2d-e. The despreading unit 23 then outputs the despreaded signals for each multipath radio signal 1a-c, 2d-e to the combining unit 24. The combining unit 24 is configured to apply weights to the output of each of the allocated despreading fingers in each of the despreaded multipath radio signals 1a-c, 2d-e, and combine, for each received multipath radio signal 1a-c, 2d-e, the weighted outputs into resulting equalized radio signals z for each received multipath radio signal 1a-c, 2d-e. The combining unit 24 may receive the equalizing weights to be applied from the delay position detection and weight calculation unit 22. It should be noted that the despreading unit 23 and the combining unit 24 may be implemented in a manner that is known in the art.

According to an embodiment of the invention, the receiver unit 7 further comprises an auto-correlation unit 21 and a delay position detection and weight calculation unit 22.

The autocorrelation unit 21 may be configured to receive the signal x from the radio unit 6 via the antenna input 8. The autocorrelation unit 21 may be configured to use an auto-correlation function to calculate auto-correlation values $r_x$ (see FIG. 4B) based on the signal x comprising the sum of all of the received multipath radio signals 1a-c, 2d-e from all UEs 1, 2, 3. The autocorrelation unit 21 may be configured to calculate the auto-correlation values on a chip-level of the signal x received at the antenna input 8. The autocorrelation unit 21 may then be configured to output the calculated auto-correlation values to the delay position detection and weight calculation unit 22. It should be noted that the auto-correlation unit 21 is thus configured to commonly calculate the auto-correlation values based on all received multipath radio signals 1a-c, 2d-e from all UEs 1, 2, 3.

Figure 4A:
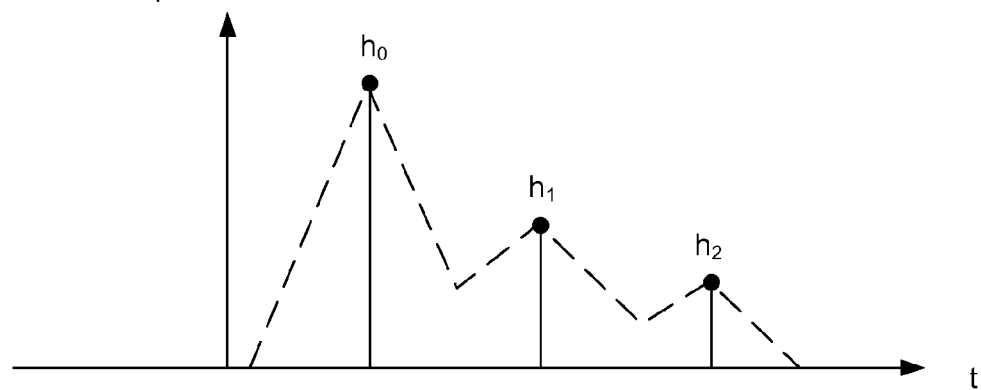
Figure 4B:
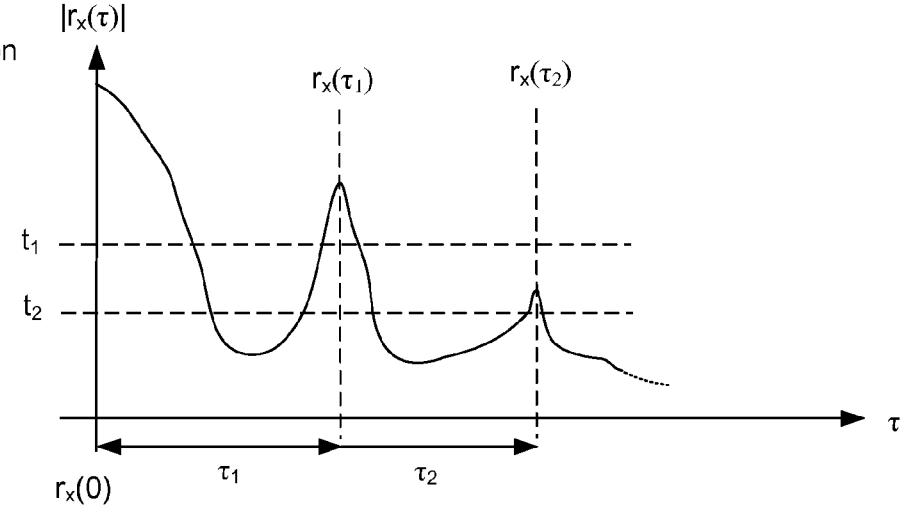

The delay position detection and weight calculation unit 22 is configured to determine at least one auto-correlation value, for example, $r_x(\tau_1)$ and/or $r_x(\tau_2)$ in FIG. 4B, based on the calculated auto-correlation values received from the autocorrelation unit 21. Based on the at least one determined auto-correlation value, the autocorrelation unit 21 may determine at least one time value, for example, $\tau_1$ and/or $\tau_2$ in FIG. 4B. Further, based on the at least one determined time value, the autocorrelation unit 21 may allocate at least one interference suppression finger, for example, $d_0+\tau_1$ or $d_0-\tau_1$ in FIG. 4C, to a delay position in a multipath radio signal 1a-c, 2d-e. This may be performed in conjunction with data from the path searching unit 20a and the channel estimation unit 20b used to allocate the RAKE fingers that collect the signal energy to their delay positions in each of the multipath radio signals 1a-c, 2d-e, for example, $d_0, d_1, d_2$ in FIG. 4C. A more detailed description of the allocation of the interference suppression finger by the delay position detection and weight calculation unit 22 to a delay position in a multipath radio signal 1a-c from the UE 1 is described in reference to FIG. 4A-4E in the following.

According to some embodiments, the delay position detection and weight calculation unit 22 is further configured to determine at least one interference suppression equalizing weight $w_{k\pm\tau_m}$ for at least one interference suppression finger allocated to a delay position in a multipath radio signal 1a-c, 2d-e based on the calculated auto-correlation values, for example, $r_x(\tau_1)$ and/or $r_x(\tau_2)$ in FIG. 4B, received from the autocorrelation unit 21. Also, the delay position detection and weight calculation unit 22 is configured to enable the combining unit 24 to apply the at least one determined interference suppression equalizing weight $w_{k\pm\tau_m}$ to the output of the corresponding interference suppression finger allocated to the delay position in the multipath radio signal 1a-c, 2d-e by sending the at least one determined interference suppression equalizing weight $w_{k\pm\tau_m}$ to the combining unit 24. Thus, the combining unit 24 may also combine the at least one weighted interference suppression output with the other weighted outputs for the multipath radio signal 1a-c, 2d-e into a resulting equalized radio signal z for each multipath radio signal 1a-c, 2d-e. This may be performed by the delay position detection and weight calculation unit 22 as described below.

For example, let $r_x$ denote the autocorrelation function computed on the chip level at the antenna input 8 of the receiver unit or BB unit 7 by the auto-correlation unit 21. Further, let a multipath radio signal y from a user equipment, for example, the multipath radio signal 1a-c from UE 1, have k number of significant channel estimates $h_k$. Each of the k number of significant channel estimates $h_k$ may thus correspond to a RAKE finger $d_k$ (that is, the "energy fingers" that collects the signal energy, for example, $d_0, d_1, d_2$ in FIG. 4C). The weights $w_k$ for the k number of RAKE fingers $d_k$ may be calculated by the delay position detection and weight calculation unit 22 according to Eq. 1:

$$w_k = \frac{h_k}{r_x(0)} \quad (Eq.\ 1)$$

These weights $w_k$ for the k number of RAKE fingers $d_k$ correspond to conventional RAKE weights (if it may be assumed that the own channel can be neglected) except for a scaling factor. It may be noted that for an LDR user, for example, UE 1 in FIG. 2, this scaling factor is actually close to the noise and interference. The weights $w_k$ may in the following also be referred to as zero-order weights and be denoted as $w_k^0$.

Now, assume that at least one auto-correlation value $\{r_x(\tau_m)\}_{m=1}^N$ (for example, the auto-correlation value $r_x(\tau_1)$) in FIG. 4B) has been identified. Further, assume that at least one interference suppression finger $d_k \pm \tau_m$ has been allocated (for example, the interference suppression fingers $d_0 + \tau_1$ and/or $d_0 - \tau_1$ in FIG. 4C) as described above and in reference to FIG. 4A-4E in the following. Then, at least one first order interference suppression equalizing weight $w_{k \pm \tau_m}^1$ may be determined for the at least one interference suppression finger $d_k \pm \tau_m$. All first order interference suppression equalizing weights $w_{k \pm \tau_m}^1$ may be determined according to Eq. 2 (in the time-domain):

$$w_{k \pm \tau_m}^1 = -\frac{h_k r_x(\pm \tau_m)}{r_x(0)^2} \quad (Eq.\ 2)$$

It should also be noted that $r_x(-\tau_m) = r_x(\tau_m)^*$.

For implementation in the delay position detection and weight calculation unit 22, a solution is mathematically described below which utilizes the Z-transform.

Signal Model and Mathematical Background

In order to describe the implementation mathematically, the problem may be formulated with an infinite signal, $y = \{y_n\}_{n=-\infty}^\infty$. The infinite signal y here denotes a multipath signal sent from a particular UE, for example, the multipath signal 1*a-c* from the UE 1. The sum of all received multipath signals at the antenna input 8 of the receiving unit or BB unit 7 is denoted x.

The method will require the autocorrelation function of x defined as $$r_x(\tau) = E_n(x_n x_{n-\tau}^*).$$

Normally this correlation may be estimated using chip samples of the signal at the antenna input 8 in an interval M:

$$r_x(\tau) \approx \frac{1}{M} \sum_{n=0}^{M-1} x_n x_{n-\tau}^*.$$

From the definition it follows that the autocorrelation has the property $$r_x(-\tau) = r_x(\tau)^*.$$

The delay operator on the signal may be defined as follows:

$$(D^1 q)_n = x_{n-1}.$$

We may also need to form a vector of delay operators $$D = \{D^{-\tau}\}_{\tau=-\infty}^\infty.$$

It can be multiplied from the left and right by a complex vector to form a linear combination of delay operators:

$$D \cdot r = \sum_{\tau=-\infty}^\infty r_\tau D^\tau.$$

Here, it may be shown that the chip level LMMSE (Linear Minimum Mean Squared Error) weights $w = \{w_n\}_{n=-\infty}^\infty$ may be given by the solution in Eq. 3:

$$(D - r_x) w = h \quad (Eq.\ 3)$$

Except for some trivial cases this solution will have an infinite impulse response. Hence it needs to be truncated in order to be applicable in practical implementations. It should also be noted that only a finite number of elements of $r_y$, h are non zero since the air channel is of finite length. Now, the formulation in Eq. 3 may be used in order to show the application of the Z-transform as described below.

Solving the Equation Using the Z-Transform

The (two sided) Z transform of an infinite sequence y is defined as:

$$Z(y)(z) = Y(z) = \sum_{k=-\infty}^\infty y_k z^{-k}$$

where z is a complex variable.

The Z transform has the property the delay operator $D^1$ in the time domain, becomes multiplication by $z^{-1}$ in the z-transform domain.

As an example the following relations follows from it:

$$Z((D - r_x) w)(z) = R_x(z) W(z).$$

Thus, applying the Z transform on Eq. 3 above yields:

$$R_x(z) W(z) = H(z).$$

The solution can be expanded in a Laurent series in order to identify the solution in the time domain according to Eq. 4:

$$W(z) = \frac{H(z)}{R_x(z)} \quad (Eq.\ 4)$$

$$= \frac{H(z)}{r_x(0)\left(1 + \sum_{\tau \neq 0} \frac{r_x(\tau)}{r_x(0)} z^{-\tau}\right)}$$

$$= H(z) r_x(0)^{-1} \sum_{n=0}^\infty \left(-\sum_{\tau \neq 0} \frac{r_x(\tau)}{r_x(0)} z^{-\tau}\right)^n$$

$$= \sum_k h_k z^{-k} r_x(0)^{-1} \sum_{n=0}^\infty \left(-\sum_{\tau \neq 0} \frac{r_x(\tau)}{r_x(0)} z^{-\tau}\right)^n$$

Here, it may be seen that last sum of the term:

$$\left(-\sum_{\tau \neq 0} \frac{r_x(\tau)}{r_x(0)} z^{-\tau}\right)^n$$

yields the n:th order of interference suppression equalizing weights.

Thus, for example, the zero-order weights $w_k$ as described above are here given by:

$$W^0(z) = \sum_k h_k z^{-k} r_x(0)^{-1},$$

or in the time domain by:

$$w_k^0 = \frac{h_k}{r_x(0)}.$$

Also, according to another example, the first order interference suppression equalizing weights $w_{k\pm\tau_m}^1$ are thus given by:

$$W^1(z) = -\sum_k h_k z^{-k} r_x(0)^{-1} \sum_{\tau \neq 0} \frac{r_x(\tau)}{r_x(0)} z^{-\tau}$$

or in the time domain by:

$$w_{k\pm\tau_m}^1 = -\frac{h_k r_x(\pm\tau_m)}{r_x(0)^2},$$

where m=1, 2, ..., M.

Figure 4C:
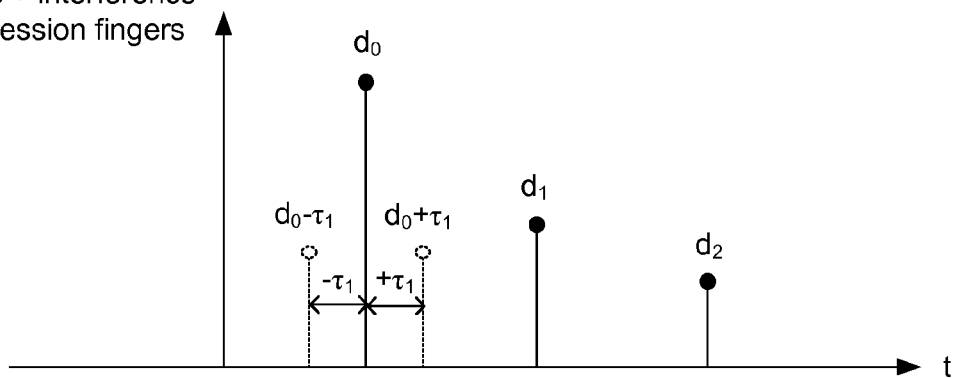
Figure 4D:
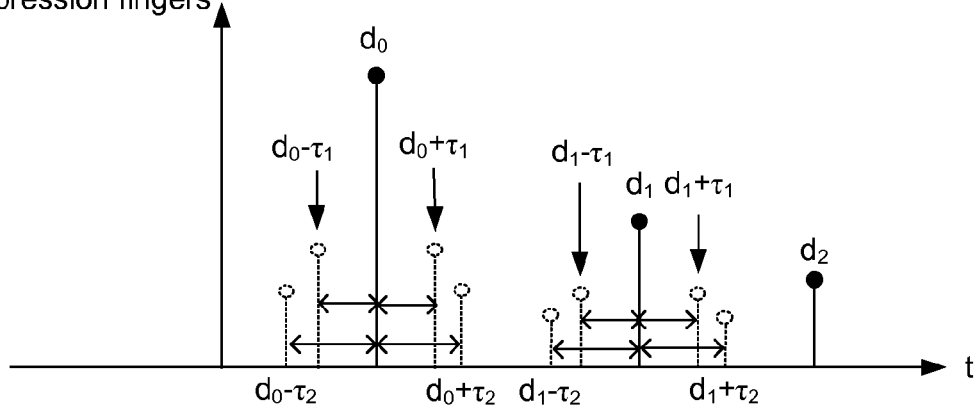
Figure 4E:
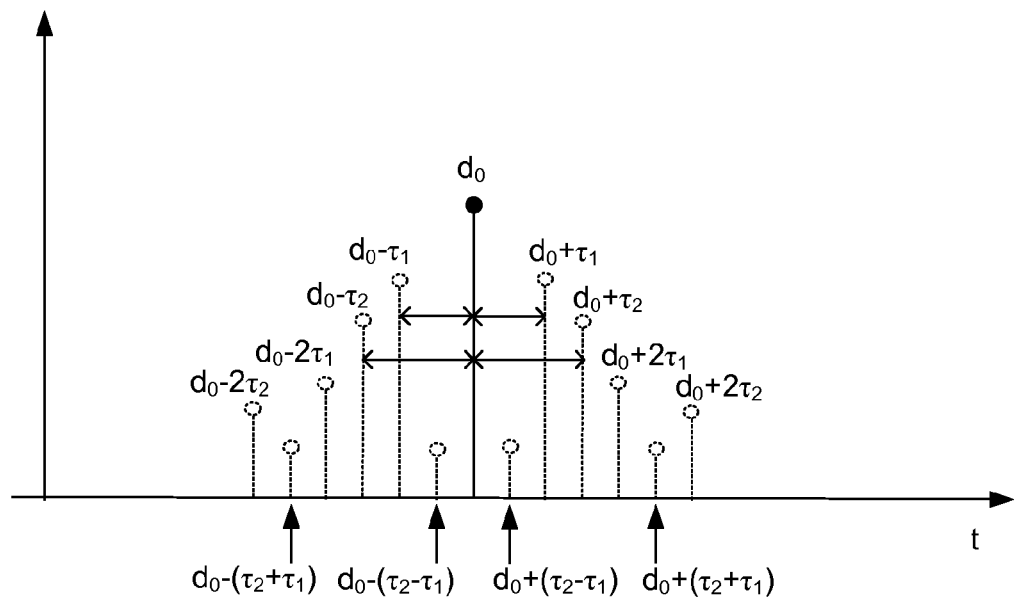

According to some embodiments, it should be noted that higher order (that is, second or further order) interference suppression equalizing weights $w_{k\pm\tau_m}^n$ may further be determined by the delay position detection and weight calculation unit 22 for higher order interference suppression fingers (for example, one of more of the interference suppression fingers $d_0\pm2\tau_1$, $d_0\pm2\tau_2$, $d_0\pm(\tau_1+\tau_2)$, and/or $d_0\pm(\tau_r-\tau_2)$ shown in FIG. 4E) based on Eq. 5:

$$W^n(z) = -\sum_k d_k z^{-k} r_x(0)^{-1} \left(\sum_{\tau_m \neq 0} \frac{r_x(\tau_m)}{r_x(0)} z^{-\tau_m}\right)^n \quad \text{(Eq. 5)}$$

wherein $d_k$ is the k:th selected despreading finger (for example, $d_0$, $d_1$, $d_2$ in FIG. 4C) where k=1, 2, ..., K, $r_x$ is the autocorrelation function representing the calculated auto-correlation values, $\tau_m$ is the at least one identified time value (for example, $\tau_1$, $\tau_2$ in FIG. 4B) where m=1, 2, ..., M, and n is the n:th order of interference suppression fingers, n=2, 3, ..., N. The importance of the higher order interference suppression fingers may, for example, be determined by the order $$\left|\frac{r_x(\tau_m)}{r_x(0)}\right|^n,$$

which normally decays quite fast. An exceptional case may be when there is a dominating UE transmitting through a highly dispersive channel.

It should be noted that if, for example, the formula in Eq. 4 above is calculated up to the second interference suppression equalizing weights $w_{k\pm\tau_m}^2$, that is, the last term in summed from n=0 to n=2, then the formula in Eq. 4 will yield all prior order of equalizing weights, that is, in this case the zero-order weights $w_k$, the first order interference suppression equalizing weights $w_{k\pm\tau_m}^1$ and the second order interference suppression equalizing weights $w_{k\pm\tau_m}^2$. However, if, for example, the formula in Eq. 4 above is only calculated for the second interference suppression equalizing weights $w_{k\pm\tau_m}^2$, that is, the last term in only calculated for n=2, then the formula in Eq. 4 will only yield the equalizing weight contribution of the second interference suppression equalizing weights $w_{k\pm\tau_m}^2$. Furthermore, as may be seen in Eq. 4, higher order of interference suppression equalizing weight calculation may also yield further equalizing weight contributions that may be added to the lower order interference suppression equalizing weights.

It should be also noted that one or more of the path searching unit 20a, the channel estimation unit 20b, the autocorrelation unit 21, the delay position detection and weight calculation unit 22, the despreading unit 23 and the combining unit 24 may be implemented in one or more processing units (not shown) which may comprise logic for performing the functionality of the receiver 7. A part, parts or all of the receiver's 7 functionality may be implemented by means of a software or computer program. The processing unit(s) may also comprise storage means or a memory unit for storing the computer program and processing means, such as, for example, a microprocessor, for executing the computer program. The storage means may also be readable storage medium separated from, but connected to the processing unit. When it is herein described that any one of the path searching unit 20a, the channel estimation unit 20b, the autocorrelation unit 21, the delay position detection and weight calculation unit 22, the despreading unit 23 and the combining unit 24 performs a certain action or function it is to be understood that a processing unit(s) in the receiver 7 may use its processing means to execute a certain part of the software or computer program which is stored in its storage means to perform this action or function.

Furthermore, the receiver unit 7 may comprise more than one antenna input 8 for receiving more than one multipath radio signal from one single user equipment, via the radio unit 6 and more than one antenna 4. The receiver unit 7 may in this case further be configured to process each multipath radio signal per user equipment received on the respective antenna input 8 separately as described above.

Below and in reference to FIG. 4A-4E, a more detailed description is presented of exemplary allocations of one or more interference suppression fingers to one or more delay position in a multipath radio signal 1a-c received from the UE 1 performed by the delay position detection and weight calculation unit 22 in a receiving unit 7 according to some embodiments of the invention.

FIG. 4A shows an example of a channel response (dashed line) of the received multipath radio signal 1a-c for the UE 1 in a receiver unit 7. The path searching unit 20a and the channel estimation unit 20b in the receiving unit 7 may extract the relevant and significant paths and produce channel estimates, such as, for example, $h_0$, $h_1$, $h_2$ in FIG. 4A, indicative of these paths to be outputted to the delay position detection and weight calculation unit 22.

FIG. 4B shows an example of auto-correlation values $|r_x(\tau)|$ calculated in the auto-correlation unit 21 in a receiver unit 7 on the sum of all multipath radio signals 1a-c, 2d-e received from all UEs 1, 2, 3. As illustrated in FIG. 4B, the delay position detection and weight calculation unit 22 may be configured to identifying one or more peak values $r_x(\tau_m)$, such as, for example, $r_x(\tau_1)$ and/or $r_x(\tau_2)$, among the calculated auto-correlation values $|r_x(\tau)|$. This may be performed, for example, by using one or more predetermined autocorrelation value thresholds, such as, $t_1$ and/or $t_2$. By determining the location of the one or more peak values $r_x(\tau_m)$, the delay position detection and weight calculation unit 22 may identify the one or more time values $\tau_m$, such as, for example, $\tau_1$ and/or $\tau_2$.

The peak values $r_x(\tau_m)$ among the calculated auto-correlation values $|r_x(\tau)|$ may be indicative of the amount of noise and interference originating from UEs transmitting to the receiver 5 at high power, such as, for example, the HDR users UE 2 and UE 3 in FIG. 2. Thus, this information may be used by the delay position detection and weight calculation unit 22 in order to achieve interference suppression in the receiver unit 7. However, the number of interference suppression fingers to be allocated based on this information by the delay position detection and weight calculation unit 22 may be determined by a finger budget based on the desired level of computational complexity of the delay position detection and weight calculation unit 22, that is, of the receiver unit 7. The finger budget may determine a total combined number of despreading fingers, such as, for example, $d_0$, $d_1$, $d_2$ in FIG. 4C, and interference suppression fingers, such as, for example, $d_0 \pm \tau_1$, $d_1 \pm \tau_1$, $d_2 \pm \tau_1$, $d_0 \pm \tau_2$, $d_1 \pm \tau_2$, $d_2 \pm \tau_2$, $d_0 \pm 2\tau_1$, $d_1 \pm 2\tau_1$, $d_2 \pm 2\tau_1$, $d_0 \pm 2\tau_2$, $d_1 \pm 2\tau_2$, $d_2 \pm 2\tau_2$, $d_0 \pm (\tau_1 + \tau_2)$, $d_1 \pm (\tau_1 + \tau_2)$, $d_2 \pm (\tau_1 + \tau_2)$, $d_0 \pm (\tau_1 - \tau_2)$, $d_1 \pm (\tau_1 - \tau_2)$, $d_2 \pm (\tau_1 - \tau_2)$ in FIGS. 4C-4E, to be allocated by the delay position detection and weight calculation unit 22, i.e the receiving unit 7.

The delay position detection and weight calculation unit 22 may also select which of the despreading fingers and interference suppression fingers that are to be allocated by the delay position detection and weight calculation unit 22, i.e the receiving unit 7. This may be based on the predetermined autocorrelation value thresholds and/or the amount of signal energy of the paths, such as, for example, $h_0$, $h_1$, $h_2$ in FIG. 4A, in the multipath radio signal. One example of a simple strategy is to add extra despreading fingers and/or interference suppression fingers until the finger budget is empty. If there is only a small finger budget, then it may even be beneficial to replace weak despreading fingers (that is, the "energy fingers" that collects the signal energy) with interference suppression fingers in order to achieve a higher suppression of the interference.

FIG. 4C schematically illustrates an example of RAKE despreading fingers and interference suppression fingers that may be allocated by the delay position detection and weight calculation unit 22 to the received multipath radio signal 1a-c in FIG. 4A according to an embodiment of the invention. In FIG. 4C, the delay position detection and weight calculation unit 22 has allocated three (3) despreading fingers $d_0$, $d_1$, $d_2$ for collecting the signal energy, and allocated a two (2) first order interference suppression fingers $d_0 \pm \tau_1$.

The first and second first order interference suppression fingers $d_0 \pm \tau_1$ are located at a delay position $d_0$ for the multipath radio signal 1a-c which corresponds to the channel estimate or path $h_0$ which currently has the largest amount of signal energy plus/minus ($\pm$) an identified first time value $\tau_1$. It should be understood that further first order interference suppression fingers may also be added at the same distance $\tau_1$ from other delay positions, such as, for example, the delay positions $d_1$, $d_2$ which corresponds to the channel estimates or paths $h_1$, $h_2$ which currently has the second and third largest amount of signal energy, etc.

FIG. 4D schematically illustrates an example of RAKE despreading fingers and interference suppression fingers that may be allocated by the delay position detection and weight calculation unit 22 to the received multipath radio signal 1a-c in FIG. 4A according to an embodiment of the invention. In FIG. 4D, the delay position detection and weight calculation unit 22 has allocated three (3) despreading fingers $d_0$, $d_1$, $d_2$ for collecting the signal energy, and allocated eight (8) first order interference suppression finger $d_0 \pm \tau_1$, $d_0 \pm \tau_2$, $d_1 \pm \tau_1$, $d_1 \pm \tau_2$.

The first and second first order interference suppression fingers $d_0 \pm \tau_1$ are the same as those shown in FIG. 4C located about the delay position $d_0$. The third and fourth first order interference suppression fingers $d_0 \pm \tau_2$ are located about the same delay position $d_0$ as for the first and second interference suppression finger $d_0 \pm \tau_1$, but instead plus and minus ($\pm$) an identified second time value $\tau_2$. The fifth, sixth, seventh and eight first order interference suppression finger $d_1 \pm \tau_1$, $d_1 \pm \tau_2$ are located at the same distances from a delay position $d_1$ for the multipath radio signal 1a-c which corresponds to the channel estimate or path $h_1$ which currently has the second largest amount of signal energy. It should be understood that further first order interference suppression fingers may also be added at the same distances $\tau_1$ and $\tau_2$ from other delay positions, such as, for example, the delay position $d_2$ which corresponds to the channel estimate or path $h_2$ which currently has the third largest amount of signal energy, etc.

FIG. 4E schematically illustrates an example of RAKE despreading fingers and interference suppression fingers that may be allocated by the delay position detection and weight calculation unit 22 to the received multipath radio signal 1a-c in FIG. 4A according to an embodiment of the invention. In FIG. 4E, for illustrative purposes, only one despreading finger $d_0$ for collecting the signal energy is shown. Here, the delay position detection and weight calculation unit 22 has allocated four (4) first order interference suppression fingers $d_0 \pm \tau_1$ and $d_0 \pm \tau_2$, and eight (8) second order interference suppression fingers $d_0 \pm 2\tau_1$, $d_0 \pm 2\tau_2$, $d_0 \pm (\tau_1 + \tau_2)$, and $d_0 \pm (\tau_1 - \tau_2)$.

The four (4) first order interference suppression fingers $d_0 \pm \tau_1$ and $d_0 \pm \tau_2$ are the same as those shown in FIG. 4D located about the delay position $d_0$. The eight (8) second order interference suppression fingers $d_0 \pm 2\tau_1$, $d_0 \pm 2\tau_2$, $d_0 \pm (\tau_1 - \tau_2)$, and $d_0 \pm (\tau_1 - \tau_2)$ are located about the same delay position $d_0$ as for the four (4) first order interference suppression fingers, but instead plus and minus ($\pm$) two times the identified first time value $2\tau_1$, plus and minus ($\pm$) two times the identified second time value $2\tau_2$, and plus and minus ($\pm$) the sum and difference of the identified first and second time values $\tau_1 + \tau_2$, $\tau_1 - \tau_2$.

It should be understood that further second order interference suppression fingers may also be added at the same distances $2\tau_1$, $2\tau_2$, $\tau_1 + \tau_2$, $\tau_1 - \tau_2$ from other delay positions, such as, for example, the delay positions $d_1$, $d_2$ which corresponds to the channel estimates or paths $h_1$, $h_2$ which currently has the second and third largest amount of signal energy, etc.

Figure 5:
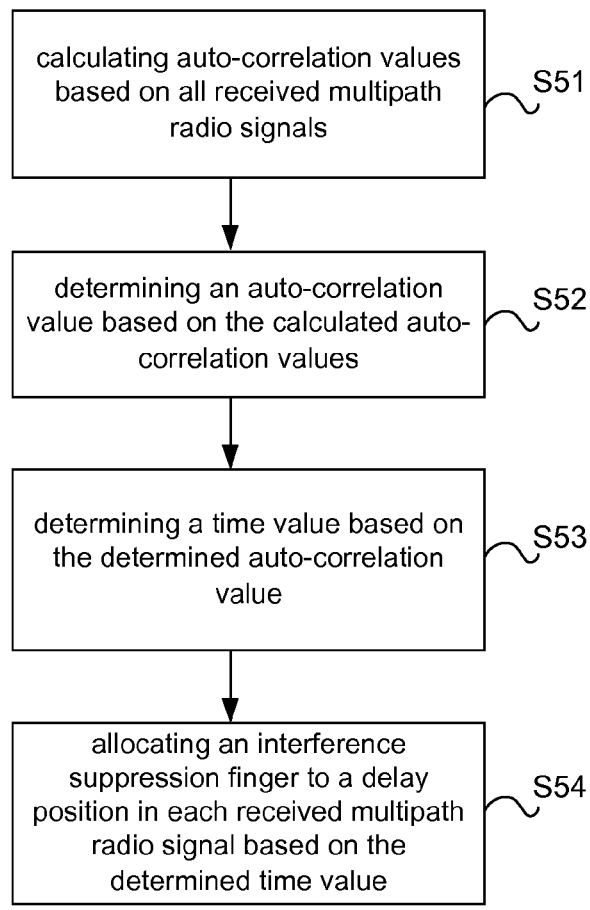
FIG. 5 is a flowchart illustrating a method according to an embodiment of the invention.

FIG. 5 is a flowchart illustrating a method according to an embodiment of the invention. In step S51, the autocorrelation unit 21 calculates auto-correlation values based on all received multipath radio signals 1a-c, 2d-e from each UE 1, 2, 3. The autocorrelation unit 21 may calculate the auto-correlation values, such as, for example, $|r_x(\tau)|$ in FIG. 4B, using an autocorrelation function on the signal x received from the radio unit 6 via the antenna input 8. The autocorrelation unit 21 may then forward the calculated auto-correlation values to the delay position detection and weight calculation unit 22.

In step S52, the delay position detection and weight calculation unit 22 may determine an auto-correlation value based on the calculated auto-correlation values from the autocorrelation unit 21. This may be performed by, for example, identifying one or more peak values, such as, for example, $r_x(\tau_1)$ and/or $r_x(\tau_2)$ in FIG. 4B, among the calculated auto-correlation values, wherein the one or more peak values may be determined using one or more predetermined autocorrelation value thresholds, such as, for example, $t_1$ and/or $t_2$ in FIG. 4B.

In step S53, the delay position detection and weight calculation unit 22 may determine a time value based on the determined auto-correlation value. This may be performed by identifying one or more time values, such as, for example, $\tau_1$ and/or $\tau_2$ in FIG. 4B, which correspond to the one or more identified peak values, such as, for example, $r_x(\tau_1)$ and/or $r_x(\tau_2)$ in FIG. 4B, among the calculated auto-correlation values, such as, for example, $|r_x(\tau)|$ in FIG. 4B.

In step S54, the delay position detection and weight calculation unit 22 may allocate an interference suppression finger to a delay position in each received multipath radio signal based on the determined time value. This may be performed by allocating one or more interference suppression fingers, such as, for example, $d_0 \pm \tau_1$ in FIG. 4C, $d_0 \pm \tau_1$ and $d_1 \pm \tau_1$ in FIG. 4D, or $d_0 \pm \tau_1$, $d_0 \pm \tau_2$, $d_0 \pm 2\tau_1$, $d_0 \pm 2\tau_2$, $d_0 \pm (\tau_1 - \tau_2)$, and $d_0 \pm (\tau_1 - \tau_2)$ in FIG. 4E, to one or more delay positions in a received multipath radio signal for a UE, such as, for example, 1a-c for UE 1 in FIG. 2, based on the one or more determined time values, such as, for example, $\tau_1$ and/or $\tau_2$ in FIG. 4B. This may be performed uniquely for each received multipath radio signal from each UE by using the one ore more determined time values commonly calculated from the sum of all received multipath radio signals from all transmitting UEs.

Figure 6:
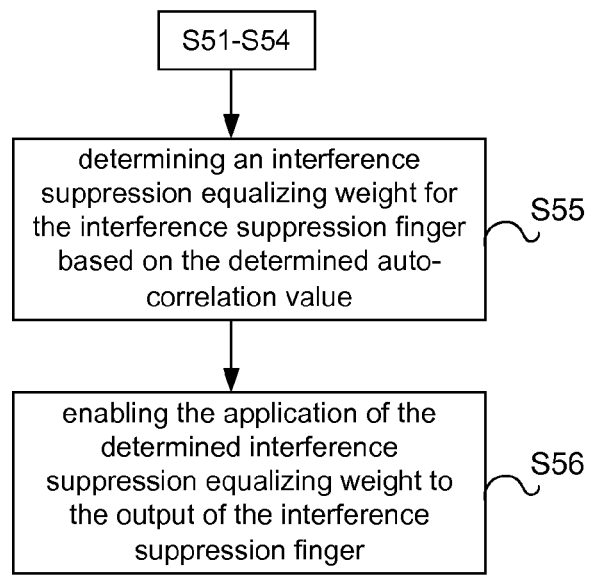
FIG. 6 is a flowchart illustrating a method according to another embodiment of the invention.

FIG. 6 is a flowchart illustrating a method according to another embodiment of the invention. First, the steps S51-S54 are performed as described above. Then, in step S55, the delay position detection and weight calculation unit 22 may determine an interference suppression equalizing weight for the interference suppression finger based on the determined auto-correlation value. This may be performed by determining one or more interference suppression equalizing weights $w_{k \pm \tau_m}''$ such as described above, for the one or more interference suppression fingers $d_k \pm \tau_m$, such as described above, based on the one or more determined auto-correlation value $r_x(\tau_m)$, such as described above.

In step S55, the delay position detection and weight calculation unit 22 may enable the application of the determined interference suppression equalizing weights $w_{k \pm \tau_m}''$ to the output of the interference suppression finger. This may be performed by forwarding the one or more determined interference suppression equalizing weights $w_{k \pm \tau_m}''$, to the combining unit 24 in FIG. 3 for application on the output of the corresponding interference suppression finger $d_k \pm \tau_m$.

It should also be noted that in addition to the exemplary embodiments shown in the accompanying drawings, the invention may be embodied in different forms and therefore should not be construed as limited to the embodiments set forth herein. Rather, these embodiments are provided so that this disclosure will be thorough and complete, and will fully convey the concept of the invention to those skilled in the art.

What is claimed is:

1. A receiver, comprising:
   at least one antenna input configured to receive multipath radio signals, via a radio circuit and at least one antenna, from one or more user equipments (UE), comprising:
   a despreading circuit configured to despread a multipath radio signal in the received multipath radio signals using a number of despreading fingers corresponding to a number of delay positions in the multipath radio signal which corresponds to a number of paths in the multipath radio signal;
   a combining circuit configured to apply at least one weight to the output of each of the number of despreading fingers and to combine the weighted outputs into a resulting equalized radio signal; and
   wherein the receiver is configured to:
   calculate auto-correlation values based on all multipath radio signals received at the at least one antenna input;
   determine at least one auto-correlation value based on the calculated auto-correlation values;
   determine at least one time value based on the at least one determined auto-correlation value; and
   allocate at least one interference suppression finger to a delay position in the multipath radio signal based on the at least one determined time value.

2. The receiver of claim 1, wherein the receiver is configured to determine the at least one determined auto-correlation value by identifying a first peak value among the calculated auto-correlation values.

3. The receiver of claim 2, wherein the receiver is configured to determine the at least one time value by identifying a first time value corresponding to the identified peak among the calculated at least one auto-correlation values.

4. The receiver of claim 3, wherein the receiver is configured to allocate at least one first order interference suppression finger to a first set of delay positions in the multipath radio signal, wherein the first set of delay positions are delay positions corresponding to a first path in the multipath radio signal plus or minus the identified first time value.

5. The receiver of claim 4, wherein the receiver is configured to allocate at least one further first order interference suppression finger to a second set of delay positions in the multipath radio signal, wherein the second set of delay positions are delay positions corresponding to at least a second path in the multipath radio signal plus or minus the identified first time value.

6. The receiver of claim 2, wherein the receiver is configured to:
   determine the at least one determined auto-correlation value by identifying at least a second peak value among the calculated auto-correlation values; and
   determine the at least one time value by further identifying at least a second time value corresponding to the at least second identified peak among the calculated at least one auto-correlation values.

7. The receiver of claim 6:
   wherein the receiver is configured to allocate at least one further first order interference suppression finger to a second set of delay positions in the multipath radio signal, wherein the second set of delay positions are delay positions corresponding to at least a second path in the multipath radio signal plus or minus the identified first time value;
   wherein the receiver is configured to allocate at least one further first order interference suppression finger to a third set of delay positions in the multipath radio signal; and
   wherein the third set of delay positions are delay positions corresponding to the first and/or at least second path in the multipath radio signal plus or minus the at least one identified second time value.

8. The receiver of claim 7:
   wherein the receiver is configured to allocate at least one second order interference suppression finger to a fourth set of delay positions in the multipath radio signal; and
   wherein the fourth set of delay positions are the delay positions corresponding to at least one of:
   the first and/or at least second path in the multipath radio signal plus or minus two times the at least one identified time value), respectively; and
   the first and/or at least second path in the multipath radio signal plus or minus the sum and/or difference of at least two identified time values.

9. The receiver of claim 1, further being configured to:
determine a total number of despreading fingers and interference suppression fingers to be allocated by the receiver based on a desired level of computation complexity in the receiver; and
select which despreading fingers and interference suppression fingers are to be allocated by the receiver based on at least one autocorrelation value threshold and an amount of signal energy of the first and/or at least a second path in the multipath radio signal.

10. The receiver of claim 1, wherein the receiver is configured to calculate the auto-correlation values based on a chip-level baseband signal comprising a sum of all multipath radio signals received at the at least one antenna.

11. The receiver of claim 1, further being configured to:
determine at least one interference suppression equalizing weight for the at least one interference suppression finger based on the at least one determined auto-correlation value; and
enable the combining circuit to apply the at least one determined interference suppression equalizing weight to the output of the at least one interference suppression finger and combine the at least one weighted interference suppression output with the weighted outputs into the resulting equalized radio signal.

12. The receiver of claim 11, wherein the receiver is configured to determine the at least one interference suppression equalizing weight for at least one first order interference suppression finger according to:

$$W^1(z) = -\sum_k d_k z^{-k} r_x(0)^{-1} \sum_{m \neq 0} \frac{r_x(\tau_m)}{r_x(0)} z^{-\tau_m}$$

in the z-transform domain, wherein $d_k$ is the k:th selected despreading finger, where k=1, 2, ..., K; $r_x$ is an auto-correlation function representing the calculated auto-correlation values; and $\tau_m$ is the at least one identified time value, where m=1, 2, ..., M.

13. The receiver of claim 11, wherein the receiver is configured to determine the at least one interference suppression equalizing weight for at least one second or higher order interference suppression finger based on:

$$W^n(z) = -\sum_k d_k z^{-k} r_x(0)^{-1} \left( \sum_{m \neq 0} \frac{r_x(\tau_m)}{r_x(0)} z^{-\tau_m} \right)^n$$

in the z-transform domain, wherein $d_k$ is the k:th selected despreading finger, where k=1, 2, ..., K; $r_x$ is an auto-correlation function representing the calculated auto-correlation values; $\tau_m$ is the at least one identified time value, where m=1, 2, ..., M; n is the n:th order of interference suppression fingers, n=2, 3, ..., N.

14. The receiver of claim 1, further comprising:
more than one antenna input for receiving more than one multipath radio signal via the radio circuit and more than one antenna from one UE; and
wherein the receiver is configured to process each multipath radio signal per UE received on respective antenna inputs separately.

15. The receiver of claim 1, wherein the receiver is a portion of a network node for use in a wireless communication network.

16. A method for suppressing interference in a received multipath radio signal in a receiver, the receiver having at least one antenna input for receiving multipath radio signals, via a radio circuit and at least one antenna, from one or more user equipments (UE), the method comprising:
allocating a number of despreading fingers to a number of delay positions in the multipath radio signal corresponding to a number of paths in the multipath radio signal;
apply at least one equalizing weight to an output of each of the number of allocated despreading fingers and combining the weighted outputs into a resulting equalized radio signal;
calculating auto-correlation values based on all multipath radio signals received at the at least one antenna input;
determining at least one auto-correlation value based on the calculated auto-correlation values;
determining at least one time value based on the at least one determined auto-correlation value; and
allocating at least one interference suppression finger to a delay position in the multipath radio signal based on the at least one determined time value.

17. The method of claim 16, wherein the determining the at least one determined auto-correlation value comprises identifying a first peak value among the calculated auto-correlation values.

18. The method of claim 17, wherein the determining the at least one time value comprises identifying a first time value corresponding to the identified peak among the calculated at least one auto-correlation values.

19. The method of claim 18, further comprising:
allocating at least one first order interference suppression finger to a first set of delay positions in the multipath radio signal; and
wherein the first set of delay positions are delay positions corresponding to a first path in the multipath radio signal plus or minus the identified first time value.

20. The method of claim 19, further comprising:
allocating at least one further first order interference suppression finger to a second set of delay positions in the multipath radio signal; and
wherein the second set of delay positions are delay positions corresponding to at least a second path in the multipath radio signal plus or minus the identified first time value.

21. The method of claim 16:
wherein the determining the at least one auto-correlation value comprises identifying at least a second peak value among the calculated auto-correlation values; and
wherein determining the at least one time value comprises identifying at least a second time value corresponding to the second identified peak value.

22. The method of claim 21, further comprising:
allocating at least one further first order interference suppression finger to a third set of delay positions in the multipath radio signal; and
wherein the third set of delay positions are delay positions corresponding to the first and/or at least second paths in the multipath radio signal currently having a largest amount of signal energy, plus or minus the identified second time value.

23. The method according to claim 22, further comprising:
allocating at least one second order interference suppression finger to a fourth set of delay positions in the multipath radio signal; and
wherein the fourth set of delay positions are delay positions corresponding to at least one of:

the first and/or at least second paths in the multipath radio signal plus or minus two times the at least one identified time value; and the first and/or at least second paths in the multipath radio signal plus or minus the sum and/or difference of at least two identified time values.

24. The method of claim 16, further comprising:

determining a total number of despreading fingers and interference suppression fingers to be allocated by the receiver based on a desired level of computation complexity in the receiver; and selecting which despreading fingers and interference suppression fingers are to be allocated by the receiver based on at least one autocorrelation value threshold and an amount of signal energy of the first and/or at least a second path in the multipath radio signal.

25. The method of claim 16, further comprising:

determining at least one interference suppression equalizing weight for the at least one interference suppression finger based on the at least one determined auto-correlation value; and enabling the application of the at least one determined interference suppression equalizing weight to an output of the at least one interference suppression finger and combination of the at least one weighted interference suppression output with the weighted outputs into the resulting equalized radio signal.

26. The method of claim 25, further comprising determining the at least one interference suppression equalizing weight for at least one first order interference suppression finger according to:

$$W^1(z) = -\sum_k d_k z^{-k} r_x(0)^{-1} \sum_{m \neq 0} \frac{r_x(\tau_m)}{r_x(0)} z^{-\tau_m}$$

in the z-transform domain, wherein $d_k$ is the k:th selected despreading finger, where k=1, 2, ..., K; $r_x$ is an auto-correlation function representing the calculated auto-correlation values; and $\tau_m$ is the at least one identified time value, where m=1, 2, ..., M.

27. The method of claim 25 further comprising determining the at least one interference suppression equalizing weight for at least one second or higher order interference suppression finger based on:

$$W^n(z) = -\sum_k d_k z^{-k} r_x(0)^{-1} \left( \sum_{m \neq 0} \frac{r_x(\tau_m)}{r_x(0)} z^{-\tau_m} \right)^n$$

in the z-transform domain, wherein $d_k$ is the k:th selected despreading finger, where k=1, 2, ..., K; $r_x$ is an auto-correlation function representing the calculated auto-correlation values; $\tau_m$ is the at least one identified time value, where m=1, 2, ..., M; n is the n:th order of interference suppression fingers, n=2, 3, ..., N.

* * * * *

UNITED STATES PATENT AND TRADEMARK OFFICE
CERTIFICATE OF CORRECTION

| | | |
|---|---|---|
| PATENT NO. | : 8,971,386 B2 | Page 1 of 1 |
| APPLICATION NO. | : 14/238896 | |
| DATED | : March 3, 2015 | |
| INVENTOR(S) | : Egnell et al. | |

It is certified that error appears in the above-identified patent and that said Letters Patent is hereby corrected as shown below:

In the Specification

In Column 5, Line 42, delete "receiver unit 23" and insert -- receiver unit 7 --, therefor.

In Column 13, Line 21, delete "one ore" and insert -- one or --, therefor.

In the Claims

In Column 14, Line 64, in Claim 8, delete "value)," and insert -- value, --, therefor.

Signed and Sealed this
Twenty-ninth Day of September, 2015

Michelle K. Lee
*Director of the United States Patent and Trademark Office*